(12) United States Patent
Olenik et al.

(10) Patent No.: US 7,191,496 B2
(45) Date of Patent: Mar. 20, 2007

(54) FORMED WIRE DEAD-END APPLIANCE FOR HIGH TEMPERATURE LINEAR BODIES

(75) Inventors: John J. Olenik, Mentor, OH (US); David C. Sunkle, Strongsville, OH (US); Robert Whapham, North Royalton, OH (US)

(73) Assignee: Preformed Line Products Company, Mayfield Village, OH (US)

( * ) Notice: Subject to any disclaimer, the term of this patent is extended or adjusted under 35 U.S.C. 154(b) by 51 days.

(21) Appl. No.: 11/060,140

(22) Filed: Feb. 17, 2005

(65) Prior Publication Data

US 2006/0179617 A1 Aug. 17, 2006

(51) Int. Cl.
*F16G 11/00* (2006.01)
(52) U.S. Cl. .................. 24/115 N; 24/122.6; 174/73.1
(58) Field of Classification Search ............... 24/122.6, 24/131 C, 115 N; 403/300, 310, 214, 185; 174/73.1
See application file for complete search history.

(56) References Cited

U.S. PATENT DOCUMENTS

| 3,555,625 | A |  | 1/1971  | Hoban           |
| 3,573,346 | A |  | 4/1971  | Appleby         |
| 3,633,252 | A |  | 1/1972  | Williams et al. |
| 3,662,084 | A |  | 5/1972  | Smrekar         |
| 3,723,636 | A |  | 3/1973  | Eucker          |
| 3,775,811 | A |  | 12/1973 | Smrekar et al.  |
| 3,800,397 | A |  | 4/1974  | Poffenberger    |
| 3,829,937 | A |  | 8/1974  | Metzler         |
| 3,847,491 | A |  | 11/1974 | Poffenberger    |
| 3,921,257 | A |  | 11/1975 | Appleby et al.  |
| 3,958,379 | A |  | 5/1976  | Williams et al. |
| 4,117,256 | A |  | 9/1978  | Williams        |
| 4,439,897 | A |  | 4/1984  | Kindel          |
| 4,523,355 | A | * | 6/1985  | Rosa ........................ 24/115 N |
| 4,770,491 | A |  | 9/1988  | Champa et al.   |
| 4,808,121 | A | * | 2/1989  | Smrekar ..................... 439/394 |
| 5,762,438 | A |  | 6/1998  | Reed, II        |

OTHER PUBLICATIONS

Application Procedure & Safety Considerations: Preformed Line Products; Thermolign™ Dead-End; For High Temperature Composite Conductors; 4 pages; Apr. 2004.

* cited by examiner

*Primary Examiner*—Robert J. Sandy
(74) *Attorney, Agent, or Firm*—Fay, Sharpe LLP

(57) ABSTRACT

An appliance is provided for terminating high temperature conductors. The appliance includes a clevis member, a first set of aluminum elongate helically formed reinforcement members, and first and second U-shaped dead-end members having leg portions formed of an aluminum material and an aluminum-coated metal material, respectively. The reinforcement members and first and second dead end members are applied to the associated conductor in a layered relationship in a manner to establish a phase ordering of aluminum alloy and aluminum covered steel wire materials over the circumference of the conductor. The combination of aluminum alloy and aluminum coated steel wire materials provides desired strength while maintaining an operating temperature of the appliance lower than an operating temperature of the associated conductor.

44 Claims, 5 Drawing Sheets

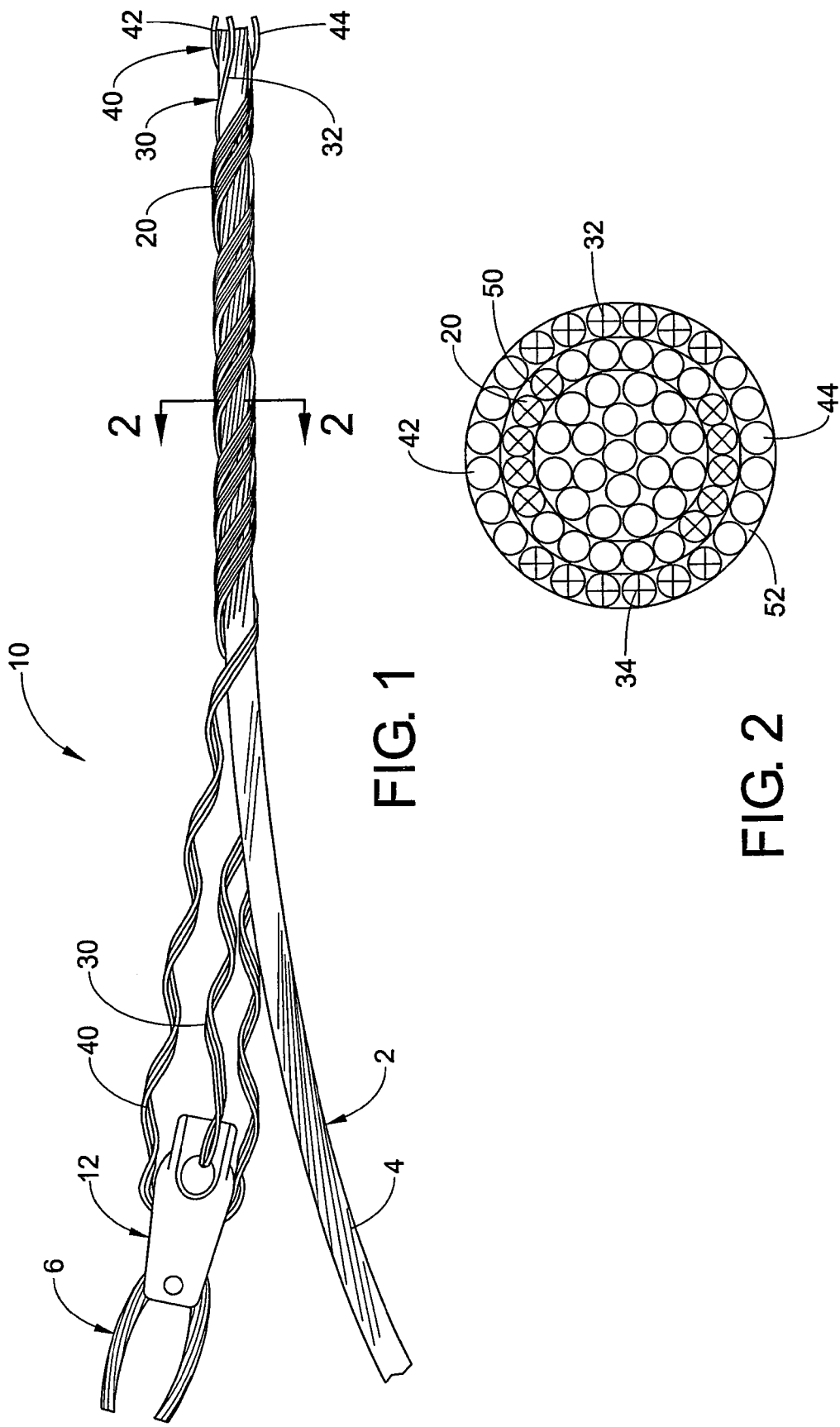

FORMED WIRE DEAD-END APPLIANCE FOR HIGH TEMPERATURE LINEAR BODIES

BACKGROUND OF THE INVENTION

The present exemplary embodiment relates to appliances for linear bodies and, more particularly, is directed to a new and improved dead-end appliance for use with linear bodies. It finds particular application in conjunction with high temperature linear bodies such as high temperature power transmission and distribution line wires, cables, and the like, and will be described with particular reference thereto. However, it is to be appreciated that the present exemplary embodiment is also amenable to other applications such as, for example, use in the construction arts for buildings, bridges and other structures, in manufacture and anywhere there is a need for connection with substantially linear bodies.

BRIEF DESCRIPTION

In accordance with one aspect of the present exemplary embodiment, an appliance for securely gripping an associated elongate body is provided. The appliance includes a clevis member, a first set of reinforcement members, and first and second U-shaped dead-end members. The clevis member defines first and second passages. The first set of reinforcement members are helically formed and are adapted for wrapping onto the associated elongate body. The first U-shaped dead-end member includes a pair of helically formed legs connected at a bight portion. The legs are adapted for wrapping onto the associated elongate body at least partially covering the first set of elongate helically formed reinforcement members. The second dead-end member similarly includes a pair of helically formed legs adapted for wrapping onto the associated elongate body at least partially covering the first set of elongate helically formed reinforcement members. The leg pairs of the dead-end members surround the reinforcement members in an interlaced non-overlapping fashion. In an assembled state of the subject appliance, a first bight portion of the first U-shaped dead-end member passes through the first passage of the clevis while the second bight member of the second dead-end member passes through the second passage of the clevis. In that way, the associated elongate body is supported as desired relative to an associated support structure.

In accordance with yet another aspect of the present exemplary embodiment, to best accommodate high temperatures, the first set of elongate helical reinforcement members are preferably formed of an aluminum alloy wire. The legs of the first dead-end member are overlayed on the helically formed reinforcement member and are preferably formed of an aluminum alloy. The legs of the second dead-end member overlay the reinforcement member, are interlaced with the legs of the first dead end member, and are preferably formed of an aluminum-coated steel/iron wire.

In accordance with yet a further aspect of the present exemplary embodiment, the lay direction of the reinforcement members is opposite that of the associated elongate conductor body. Further, the lay direction of the first and second dead-end members is the same as the lay direction of the associated elongate conductor body. In that way, by alternating lay direction layers, axial tensile loads are transferred by providing a substantially constant, equally distributed, radial force that is torque balanced along the length of the dead-end and does not damage the outside layers or inner core of the associated elongate conductor body.

In accordance with still further another aspect of the present exemplary embodiment, a conductive grit is provided on the inner surface of the helical members for increasing the electrical and thermal conductivity of the interface therebetween and thus improving the overall electrical and thermal conductivity of the appliance resulting in superior heat transfer and a reduction in the overall temperature of the connection.

BRIEF DESCRIPTION OF THE DRAWINGS

FIG. 1 is side elevational view of the subject appliance in assembled relation with an associated linear body in partial breakaway to depict the individual components;

FIG. 2 is a cross-sectional view taken along line 2—2 of FIG. 1;

DETAILED DESCRIPTION

Figure 3:
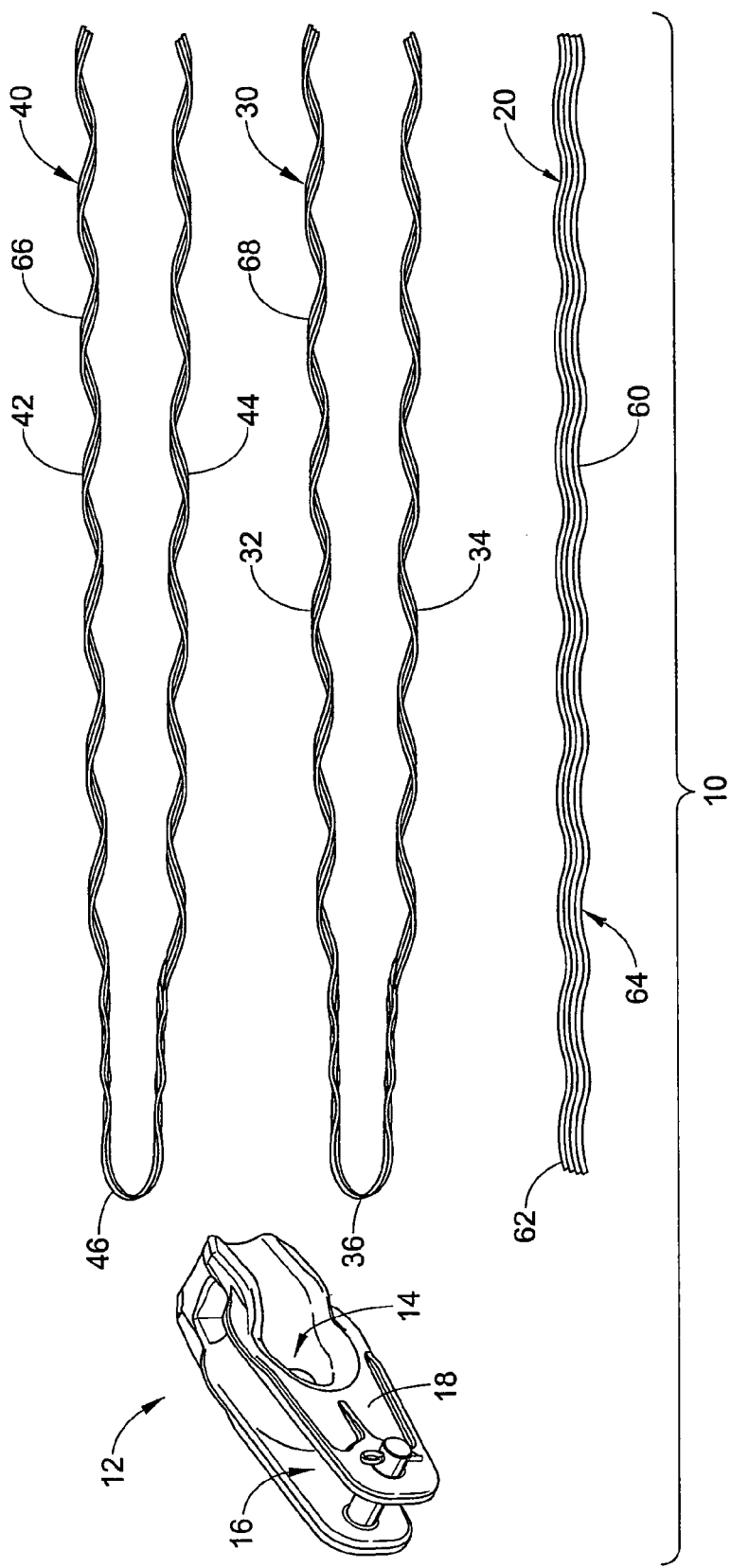
FIG. 3 is an exploded view depicting the individual components of the subject appliance and arranged for easy understanding.

With reference to FIG. 1, the subject appliance 10 is shown applied in gripping relation on an associated elongate body which, as illustrated, is a high temperature conductor. The subject appliance 10 is shown in partial breakaway to illustrate the manner in which the individual components are arranged and disposed in order to affect a secure grip on a high temperature associated elongate body. Generally, the appliance 10 includes a clevis member 12 at a terminal end thereof for connection of the appliance to an associated support structure 6 using known means. In addition, the appliance 10 includes a set of reinforcement members 20 wrapped onto the associated elongate body 2. A first U-shaped dead-end member 30 includes a pair of legs 32, 34 wrapped onto the associated elongate body 2 in a manner to at least partially cover the set of reinforcement members 20. The legs 32, 34 of the first dead-end member 30 are connected at a first bight portion 36 which, as illustrated, extends through a first passage 14 defined by the clevis member 12. Similarly, a second dead-end member 40 includes a pair of legs 42, 44 extending therefrom and being adapted for wrapping onto the associated elongate body 2 in a manner to at least partially cover the set of reinforcement members 20. The first and second legs 42, 44 of the second dead-end member 40 are connected at a second bight portion 46 which, in the assembled arrangement illustrated in the figure extends through a second passage 16 defined by the clevis member 12. Also, the first and second legs 32, 34 of the first dead end member 30 are interlaced with the first and second legs 42, 44 of the second dead end member 40.

FIG. 2 is a cross-sectional view of the appliance applied onto the associated body 2 of FIG. 1 taken along line 2—2. With reference now to that Figure, it is to be appreciated that the set of reinforcement members 20 and the first and second dead-end members 30, 40 are applied onto the associated elongate body 2 generally in an overlapping fashion. The outer layer formed by the legs 32, 34 and 42, 44 of the dead end members 30, 40 helically surrounds and engages the underlying layer formed by the reinforcement member 20 to firmly hold the linear body 2 in place relative to the appliance 10.

As illustrated in FIG. 2, the subject appliance 10 securely grips an associated elongate body 2 such as, for example, a high temperature conductor 4. In accordance with one aspect of the exemplary embodiment of this application, the overall construction of the appliance preferably alternates or phases the layering of aluminum alloy materials with aluminum covered steel wire materials over the circumference of the associated linear body conductor. To that end, as illustrated, a first layer 50 immediately surrounds and directly contacts the conductor 4. The first layer is defined by a set of reinforcement members 20 as illustrated. As noted above, preferably, the reinforcement member set is formed of an aluminum material. A second layer 52 immediately surrounds and is in direct contact with the first layer 50. The second layer 52 is defined by the first and second legs 32, 34 of the first dead-end member 30 and by the first and second legs 42, 44 of the second dead end member.

The first dead-end, as noted above, is preferably formed of an aluminum material and, the second dead-end member 40 is formed of an aluminum coated metal/iron material. The legs 32, 34 of the first dead end member 30 and the legs 42, 44 of the second dead end member 40 are preferably wrapped onto the first layer 50 in a staggered interlaced pattern. In that manner, as best illustrated in FIG. 2, the general overall construction of the appliance 10 automatically alternates or phases the order of aluminum alloy materials with aluminum covered steel materials over the circumference of the associated conductor. It is believed that the aluminum alloy structural layers distribute heat from the high temperature conductor 40 owing at least in part to direct (abutting) contact between the first 32, 34 and second 42, 44 set of legs over a large surface area to thereby increase thermal conductivity. Also, the combination of aluminum alloy and aluminum-coated steel components provide the desired strength required while maintaining an operating temperature of the appliance 10 lower than an operating temperature of the associated conductor 4.

FIG. 3 is an exploded view depicting the individual components of the subject appliance 10 formed in accordance with the preferred embodiment. The components are decoupled from the application condition of FIG. 1 for ease of description and understanding. As shown, the appliance 10 includes a clevis member 12, a set of reinforcement members 20 (a set of one is illustrated), a first dead-end member 30, and a second dead-end member 40. With reference first to the clevis member 12, first and second passages 14, 16 are defined by a main body portion 18. The passages are adapted to receive portions of the first and second dead end members 30, 40 in a manner to be described in greater detail below.

With continued reference to FIG. 3, the first set of reinforcement members 20 includes a single helically formed elongate member 60. Preferably, the elongate member is formed of an aluminum material and may be manufactured or otherwise formed by any suitable method. In this preferred form, however, the elongate member 60 is composed of multiple strands or elements of aluminum or other aluminum alloy metals. The individual elements of the elongate member 60 are preferably secured in the bridging relationship illustrated by means of an adhesive, solder, brazing compound, or the like. In the preferred embodiment illustrated, each helically formed elongate member 60 in the first set of reinforcement members 20 includes four individual rod elements 62 soldered together in a side-by-side relationship. Although four rods are preferred, more or less can be used. In addition, an electrically conductive grit 64 is made to adhere to the helical elongate member 60 for purposes of promoting thermal/electrical conductivity from the associated high temperature conductor 4 and through the appliance 10 when arranged in its installed state.

Still further with reference to FIG. 3, each of the first and second dead-end members 30, 40 include respective leg portions 32, 34 and 42, 44, respectively. The leg portions are connected by means of first and second bight portions 36, 46, respectively. Each of the respective leg portions of the dead-end members 30, 40 are preformed to have a pitch length sufficiently long so that they may be applied sideways to an associated linear body 2 and then wrapped thereabout by rotating the legs around the body in the direction of provocation of the helices. The internal diameters of the helically formed legs of each of the dead-end members 30, 40 are preferably somewhat less than the external diameter of the bodies onto which they are intended to be wrapped. More particularly, the internal diameter of the helically preformed legs 32, 34 of the first dead-end member 30 as well as of the legs 42, 44 of the second dead-end member 40 are preferably somewhat less than the external diameter defined by the reinforcement member 20 wrapped onto the associated linear body 2. In any case, however, the internal diameter of the helices should be sufficiently great so that the elastic limit of the material is not exceeded. In this manner, it is possible to achieve a tight grip relationship between the helices and the linear body and dual layers formed by the appliance 10 to essentially preclude longitudinal movement therebetween.

With continued reference to FIG. 3, it is to be noted that, preferably, each of the first and second leg portions 32, 34 of the first dead end member 30 are formed of an aluminum material. Selection of aluminum allows for efficient heat dissipation from the reinforcement member 20 outwardly from the appliance 10. Each of the first and second leg portions 42, 44 of the second dead end member 40, however, are formed of an aluminum clad steel/iron construction. The aluminum cladding is provided for purposes of corrosion resistance due to atmospheric corrosion and dissimilar metals. A substantial cross-sectional portion, however, of the legs 42, 44 is formed of a steel/iron composition in order to provide strength integrity to the appliance 10.

Lastly, in connection with FIG. 3, each of the first and second dead-end members 30, 40 carry a thermally conductive grit 66, 68, respectively. The grit is adhered by means of an adhesive and aids in dissipating heat from the linear body 2 outwardly through the subject appliance 10. Preferably, the thermally conductive grit includes an aluminum oxide conductive grit disposed at the interfaces between layers of one or more of the reinforcement members 20 on the associated conductor, between legs 32, 34 of the first dead end member 30 and the reinforcement member 20, and between legs 42, 44 of the second dead end member 40 and the reinforcement member 20.

Figure 4:
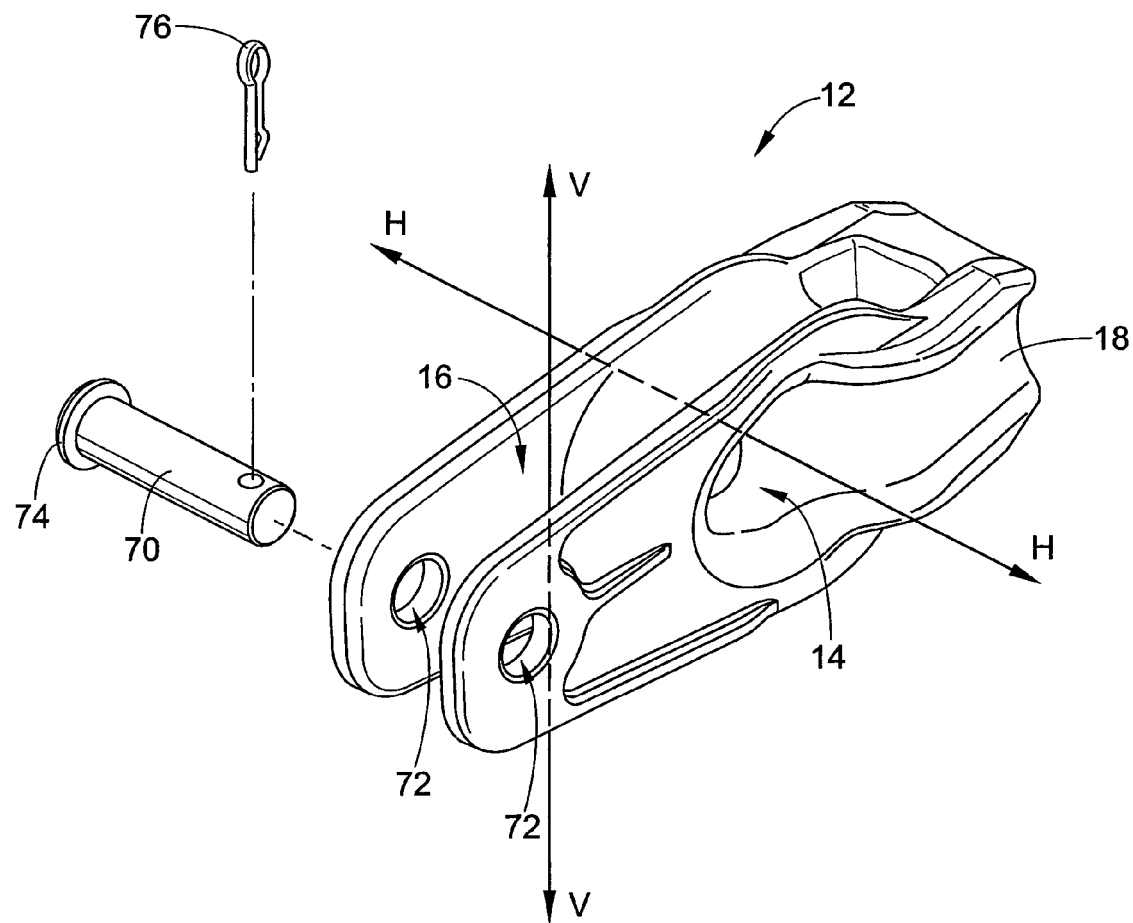
FIG. 4 is a perspective view of a clevis component used in the subject appliance.

With reference next to FIG. 4, the preferred structure of the clevis member 12 is illustrated. As shown, first and second passages 14, 16 are defined by a main body portion 18. The first passageway 14 defines a horizontal axis H which, in an assembled relation of the appliance 10 with the associated linear body is substantially along a physical horizontal plane. The second passageway 16 defines a second longitudinal axis V which is substantially perpendicular to first axis H. In the assembled relation of the appliance on the associated linear body, the second axis V extends substantially along a vertical plane. It is to be appreciated, however, that it is only preferable that the first and second axes H, V are mutually perpendicular and that their relation relative to vertical or horizontal planes in a particular physical application is not critical.

Also shown in FIG. 4, the clevis member 12 includes a pin member 70 adapted to be received through spaced apart openings 72 formed in the body 18 of the clevis member 12. The pin 70 is retained in position by an enlarged head 74 at one end and a cotter pin or the like 76 receivable through a suitable transverse opening at the other end thereof. Other suitable fasteners can be used as well.

With references next to FIGS. 5a–5d, a preferred method of forming or assembling the subject appliance 10 onto an associated high temperature conductor 4 will be described first in connection with the first set of reinforcement members 20. For clarity, the drawings illustrate each reinforcement member as having a unitary construction. As described above, however, each reinforcement members 20 includes a single helically formed elongate member 60. Preferably, the elongate member is formed of an aluminum material and may be manufactured or otherwise formed by any suitable method. In this preferred form, however, the elongate member 60 is composed of multiple strands or elements of aluminum or other aluminum alloy metals. The individual elements of the elongate member 60 are preferably secured in the bridging relationship illustrated by means of an adhesive, solder, brazing compound, or the like. In the preferred embodiment illustrated, each helically formed elongate member 60 in the first set of reinforcement members 20 includes four individual rod elements 62 soldered together in a side-by-side relationship. Although four rods are preferred, more or less can be used. It is to be appreciated that one or more individual reinforcement members 20', 20" are used in the overall construction of the subject appliance as needed or desired. FIGS. 5a–5d show the installation of a pair of two (2) reinforcement members 20', 20" applied onto the associated high temperature conductor 4. In the preferred embodiment, however, 4–6 or more individual reinforcement members are used, the number being dependent upon application characteristics such as size of the conductor and the like.

Figure 5A:
FIGS. 5a–5d illustrate the application of a reinforcement member of the subject appliance onto the associated linear body; and, FIGS. 6a and 6b illustrate a subassembly of dead-end members on the clevis member and partial installation of the subassembly onto a linear body, respectively.
Figure 5B:
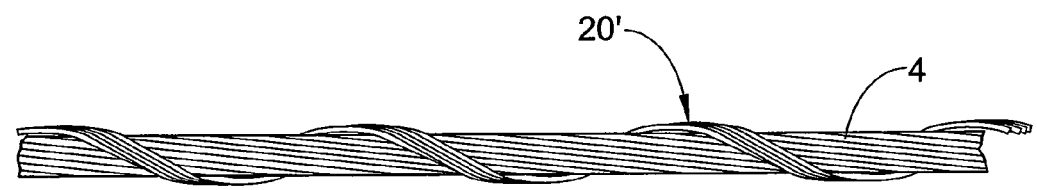
Figure 5C:
Figure 5D:
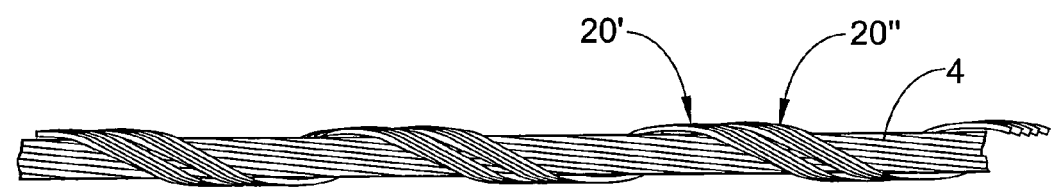

Application of the reinforcement member components 20', 20" are shown in FIGS. 5b and 5d. More particularly, a first reinforcement member 20' is wrapped onto the associated conductor 4 as shown in FIG. 5b. The second reinforcement 20" is similarly wrapped onto the associated conductor 4 in an abutting relation relative to the first reinforcement member 20'. Using this scheme, one or more additional reinforcement members (not shown) are wound onto the associated conductor 4 in an abutting relationship to thereby form a set of reinforcement members 20 forming the first layer 50 surrounding the high temperature conductor 4.

Figure 6A:
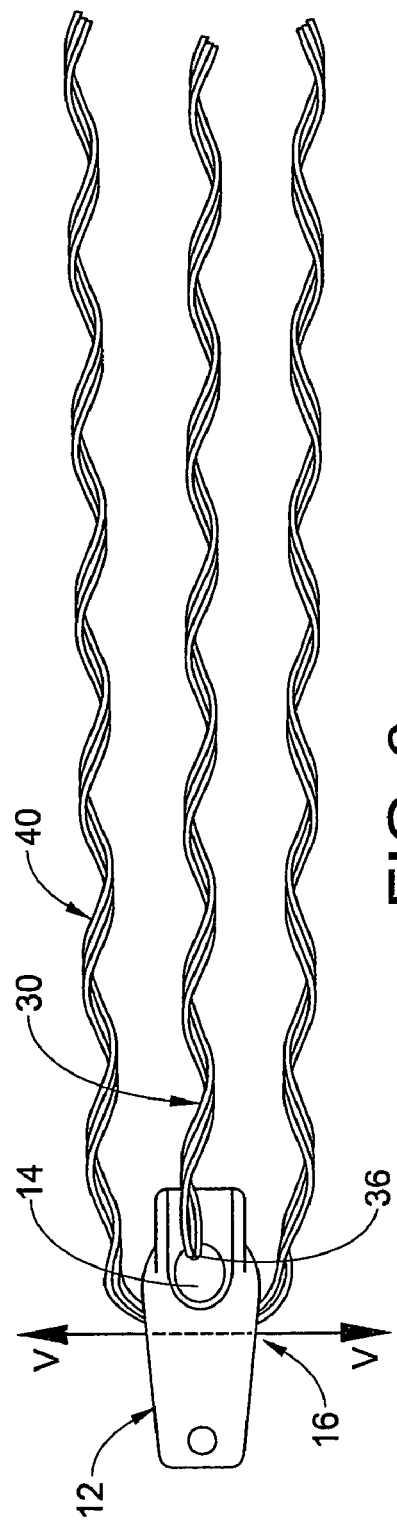
Figure 6B:
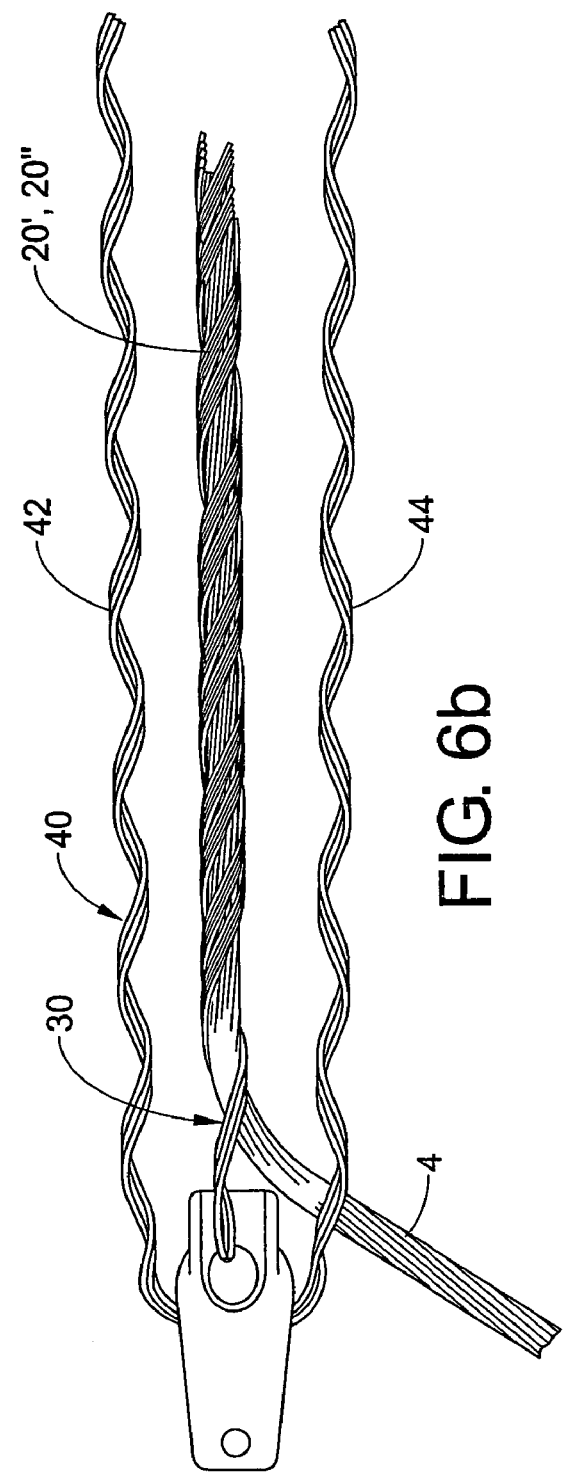

FIGS. 6a and 6b schematically depict the application of the clevis member 12 and first and second dead end members 30, 40 onto the associated high temperature conductor 4, preferably in a mutual interlaced and abutting relationship and layered upon the first set of reinforcement member 20', 20". Initially, the first dead end member 30 is extended through the first passageway 14 formed by the clevis member 12 so that the first bite 36 thereof extends through the first passageway 14 and substantially along the first longitudinally axis H defined thereby. Next, the second dead end member 40 is threaded through the second passageway 16 to an extent that the second bite 46 thereof extends substantially along the second axis V. In that way, the first and second dead end member 30, 40 and their respective legs are phased 90 degrees apart by virtue of the perpendicular relationship between the first and second axes H, V.

FIG. 6b shows the first dead end member 30 wrapped onto the underlying set of reinforcement members 20', 20". As noted earlier, it is preferred that the lay direction of the legs 32, 34 and 42, 44 of the first and second dead end members 30, 40 are in the same direction of the lay direction of the associated high temperature conductor 4. In that way, by alternating lay direction layers, axial tensile loads are transferred by providing a substantially constant, equally distributed, radial force that is torque balanced along the length of the dead-end and does not damage the outside layers or inner core of the associated elongate conductor body.

After the first dead end member 30 is wound onto the underlying layer of reinforcement members 20', 20", the first and second legs 42, 44 of the second dead end member 40 are wound onto the reinforcement members 20', 20" in the gaps between first and second legs 32, 34 of the first dead end member 30 using techniques well known in the art. It is preferred that the legs 32, 34 are arranged on the reinforcement members 20', 20" in a shoulder to shoulder abutting relationship with the legs 42, 44 to promote thermal conductivity and enhanced strength characteristic of the subject appliance.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An appliance for securely gripping an associated elongate body, the appliance comprising:
   a clevis member defining first and second passages;
   a first set of elongate helically formed reinforcement members for wrapping about said associated elongate body;
   a first U-shaped dead-end member having a first pair of helically formed legs connected at a first bight portion, the first pair of helically formed legs being wrapped onto said associated elongate body at least partially covering said first set of elongate helically formed reinforcement members, the first bight portion extending through the first passage of said clevis; and,
   a second U-shaped dead-end member having a second pair of helically formed legs connected at a second bight portion, the second pair of helically formed legs being wrapped onto said associated elongate body at least partially covering said first set of elongate helically formed reinforcement members, and the second bight portion extending through said second passage of said clevis.

2. The appliance according to claim 1 wherein:
   each of said elongate helically formed reinforcement members of said first set is formed of an aluminum material;
   said first dead-end member is formed of an aluminum material; and,
   said second dead-end member is formed of an iron material.

3. The appliance according to claim 2 wherein:
said second dead-end member is formed of an aluminum clad iron material.

4. The appliance according to claim 1 further including a conductive grit disposed at least one of:
  a first interface between the first set of elongate helically formed reinforcement members and said associated elongate body;
  a second interface between the first pair of helically formed legs of said first dead end member and the first set of elongate helically formed reinforcement members; and,
  a third interface between the second pair of helically formed legs of said second dead end member and the first set of elongate helically formed reinforcement members.

5. The appliance according to claim 4 wherein said conductive grit is disposed at each of said first, second, and third interfaces.

6. The appliance according to claim 5 wherein said conductive grit is electrically conductive.

7. The appliance according to claim 5 wherein said conductive grit is aluminum oxide.

8. The interface according to claim 1 wherein said first set of elongate helically formed reinforcement members includes a single elongate helically formed reinforcement member.

9. The appliance according to claim 8 wherein said single elongate helically formed reinforcement member is formed of a plurality of elongate rods bonded together and bent into a helical shape.

10. The appliance according to claim 9 wherein said single elongate helically formed reinforcement member is formed from about four to six or more elongate rods bonded together and bent into said helical shape.

11. The appliance according to claim 1 wherein:
  the first passage formed by said clevis defines a first longitudinal axis; and,
  the second passage formed by said clevis defines a second longitudinal axis substantially perpendicular to said first longitudinal axis.

12. The appliance according to claim 1 wherein said first pair of helically formed legs and said second pair of helically formed legs are wrapped onto said first set of reinforcement members in an interlaced non-overlapping arrangement.

13. The appliance according to claim 12 wherein said first pair of legs are disposed on the first set of reinforcement members in abutting relation with said second pair of legs.

14. The appliance according to claim 1 wherein said clevis member includes:
  a body defining spaced apart openings; and,
  a pin member extending through the spaced apart openings.

15. An appliance for securely gripping an associated elongate body, the appliance comprising:
  a clevis member;
  a first reinforcement member spaced from the clevis member and being disposed on said associated elongate body;
  a first member connecting said associated elongate body with said clevis member, the first member having a first pair of legs being wrapped onto said associated elongate body at least partially covering said reinforcement member; and,
  a second member connecting said associated elongate body with said clevis member, the second member having a second pair of legs being wrapped onto said associated elongate body at least partially covering said reinforcement member.

16. The appliance according to claim 15 wherein:
  said reinforcement member is formed of an aluminum material;
  said first member is formed of an aluminum material; and,
  said second member is formed of an iron material.

17. The appliance according to claim 15 wherein:
  said second member is formed of an aluminum clad iron material.

18. The appliance according to claim 15 wherein said first pair of legs and said second pair of legs are wrapped onto said reinforcement member in an interlaced non-overlapping arrangement.

19. An appliance for securely gripping an associated elongate body, the appliance comprising:
  a clevis member;
  a first reinforcement member on said associated elongate body;
  a first member connected with said clevis member having a first pair of legs being wrapped onto said associated elongate body at least partially covering said reinforcement member;
  a second member connected with said clevis member having a second pair of legs being wrapped onto said associated elongate body at least partially covering said reinforcement member; and,
  a conductive grit disposed at least one of: a first interface between the reinforcement member and said associated elongate body; a second interface between the first pair of legs of said end member and the reinforcement member; and, a third interface between the second pair of legs of said second member and the reinforcement member.

20. The appliance according to claim 19 wherein said conductive grit is disposed at each of said first, second, and third interfaces.

21. The appliance according to claim 20 wherein said conductive grit is electrically conductive.

22. The appliance according to claim 19 wherein:
  said reinforcement member is formed of an aluminum material;
  said first member is formed of an aluminum material; and,
  said second member is formed of an iron material.

23. The appliance according to claim 22 wherein:
  said second member is formed of an aluminum clad iron material.

24. The appliance according to claim 19 wherein said first pair of legs and said second pair of legs are wrapped onto said reinforcement member in an interlaced non-overlapping arrangement.

25. The appliance according to claim 19 wherein said conductive grit is aluminum oxide.

26. An appliance for securely gripping an associated elongate body, the appliance comprising:
  a clevis member;
  a first set of elongate helically formed reinforcement members configured to be wrapped onto said associated elongate body;
  a first U-shaped dead-end member having a first pair of helically formed legs connected at a first bight portion, the first pair of helically formed legs being wrapped onto said associated elongate body at least partially covering said first set of elongate helically formed reinforcement members, the first bight portion being operatively coupled with said clevis member; and, a second U-shaped dead-end member having a second pair of helically formed legs connected at a second bight portion, the second pair of helically formed legs being wrapped onto said associated elongate body at least partially covering said first set of elongate helically formed reinforcement members, and the second bight portion being operatively coupled with said clevis member.

27. The appliance according to claim 26 wherein:
each of said elongate helically formed reinforcement members of said first set is formed of an aluminum material;
said first dead-end member is formed of an aluminum material; and,
said second dead-end member is formed of an iron material.

28. The appliance according to claim 27 wherein:
said second dead-end member is formed of an aluminum clad iron material.

29. The appliance according to claim 26 further including a conductive grit disposed in at least one of:
a first interface between the first set of elongate helically formed reinforcement members and said associated elongate body;
a second interface between the first pair of helically formed legs of said first dead end member and the first set of elongate helically formed reinforcement members; and,
a third interface between the second pair of helically formed legs of said second dead end member and the first set of elongate helically formed reinforcement members.

30. The appliance according to claim 29 wherein said conductive grit is disposed in each of said first, second, and third interfaces.

31. The appliance according to claim 29 wherein said conductive grit is electrically conductive.

32. The appliance according to claim 29 wherein said conductive grit is aluminum oxide.

33. The interface according to claim 26 wherein said first set of elongate helically formed reinforcement members includes a single elongate helically formed reinforcement member.

34. The appliance according to claim 33 wherein said single elongate helically formed reinforcement member is formed of a plurality of elongate rods bonded together and bent into a helical shape.

35. The appliance according to claim 34 wherein said single elongate helically formed reinforcement member is formed from about four to six or more elongate rods bonded together and bent into said helical shape.

36. The appliance according to claim 26 wherein:
the first passage formed by said clevis defines a first longitudinal axis; and,
the second passage formed by said clevis defines a second longitudinal axis substantially perpendicular to said first longitudinal axis.

37. The appliance according to claim 26 wherein said first pair of helically formed legs and said second pair of helically formed legs are wrapped onto said first set of reinforcement members in an interlaced non-overlapping arrangement.

38. The appliance according to claim 37 wherein said first pair of legs are disposed on the first set of reinforcement members in abutting relation with said second pair of legs.

39. The appliance according to claim 26 wherein a lay direction of said first set of reinforcement members is opposite a lay direction of said first and second dead end members.

40. The appliance according to claim 39 wherein the lay direction of the first and second dead end members is the same as the lay direction of said associated elongate body.

41. An appliance for securely gripping an associated elongate helical body defining a first lay direction, the appliance comprising:
a clevis member;
a first helical reinforcement member defining a second lay direction opposite the first lay direction and being disposed on said associated elongate body;
a first dead end member connected with said clevis member and having a first pair of legs configured to be wrapped onto said associated elongate body at least partially covering said reinforcement member, the first pair of legs being arranged in said first lay direction defined by said associated helical body; and,
a second dead end member connected with said clevis member and having a second pair of legs configured to be wrapped onto said associated elongate body at least partially covering said reinforcement member, the second pair of legs being arranged in said first lay direction defined by said associated helical body.

42. The appliance according to claim 41 wherein:
said reinforcement member is formed of an aluminum material;
said first dead end member is formed of an aluminum material; and,
said second dead end member is formed of an iron material.

43. The appliance according to claim 42 wherein:
said second dead end member is formed of an aluminum clad iron material.

44. The appliance according to claim 41 wherein said clevis member includes a body defining spaced apart openings and a pin member extending through the spaced apart openings.

* * * * *